United States Patent
Suryanarayanan et al.

(10) Patent No.: US 9,746,903 B2
(45) Date of Patent: *Aug. 29, 2017

(54) METHOD, APPARATUS, AND SYSTEM FOR ENERGY EFFICIENCY AND ENERGY CONSERVATION INCLUDING DETECTING AND CONTROLLING CURRENT RAMPS IN PROCESSING CIRCUIT

(71) Applicant: Intel Corporation, Santa Clara, CA (US)

(72) Inventors: Anupama Suryanarayanan, Hillsboro, OR (US); Matthew C. Merten, Hillsboro, OR (US); Ryan L. Carlson, Hillsboro, OR (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,994

(22) Filed: Aug. 11, 2015

(65) Prior Publication Data

US 2015/0346804 A1    Dec. 3, 2015

Related U.S. Application Data

(63) Continuation of application No. 13/340,511, filed on Dec. 29, 2011, now Pat. No. 9,134,788.

(51) Int. Cl.
*G06F 1/00* (2006.01)
*G06F 1/32* (2006.01)

(52) U.S. Cl.
CPC ........ *G06F 1/3243* (2013.01); *Y02B 60/1239* (2013.01)

(58) Field of Classification Search
CPC .......................................................... G06F 1/32
See application file for complete search history.

(56) References Cited

U.S. PATENT DOCUMENTS

| | | | |
|---|---|---|---|
| 6,430,074 B1 * | 8/2002 | Srinivasan | G11C 15/00 365/203 |
| 6,564,328 B1 | 5/2003 | Grochowski et al. | |
| 2007/0182376 A1 * | 8/2007 | Doyle | H02J 1/14 713/300 |
| 2008/0231326 A1 | 9/2008 | Rai et al. | |
| 2008/0273628 A1 | 11/2008 | Kurata | |
| 2008/0302780 A1 | 12/2008 | Zhang et al. | |
| 2010/0041967 A1 | 2/2010 | McCraty et al. | |
| 2010/0241306 A1 * | 9/2010 | Akisada | B60H 1/00735 701/33.4 |

(Continued)

*Primary Examiner* — Mohammed Rehman
(74) *Attorney, Agent, or Firm* — Nicholson De Vos Webster & Elliott LLP

(57) ABSTRACT

Some implementations provide techniques and arrangements for adjusting a rate at which operations are performed by a processor based on a comparison of a first indication of power consumed by the processor as a result of performing a first set of operations and a second indication of power consumed by the processor as a result of performing a second set of operations. The rate at which operations are performed by the processor may be adjusted when the comparison indicates that a difference between the first indication of power consumed by the processor and the second indication of power consumed by the processor is greater than a threshold value.

17 Claims, 9 Drawing Sheets

(56) References Cited

U.S. PATENT DOCUMENTS

| | | |
|---|---|---|
| 2011/0063768 A1 | 3/2011 | Sexton et al. |
| 2011/0231856 A1* | 9/2011 | Son .................... G06F 9/5088 |
| | | 718/103 |
| 2011/0235083 A1 | 9/2011 | Suzuki |
| 2012/0159225 A1 | 6/2012 | Fleischman et al. |
| 2012/0193985 A1* | 8/2012 | Kim .................... D06F 33/02 |
| | | 307/35 |
| 2013/0124900 A1 | 5/2013 | Emberling et al. |

* cited by examiner

METHOD, APPARATUS, AND SYSTEM FOR ENERGY EFFICIENCY AND ENERGY CONSERVATION INCLUDING DETECTING AND CONTROLLING CURRENT RAMPS IN PROCESSING CIRCUIT

The present patent application is a continuation application claiming priority to U.S. patent application Ser. No. 13/340,511, filed Dec. 29, 2011 titled "A Method, Apparatus, and System for Energy Efficiency and Energy Conservation Including Detecting and Controlling Current Ramps in Processing Circuit", which is incorporated herein by reference in its entirety.

BACKGROUND

Advances in semi-conductor processing and logic design have permitted an increase in the amount of logic that may be present on integrated circuit devices. As a result, computer system configurations have evolved from single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

A current ramp, i.e., a rapid change in the current drawn by a circuit, can cause a temporary spike or droop in the supply voltage drawn from a voltage regulator due to the impedances in the circuit. For example, an increase in the current drawn (i.e. an upward current ramp) may cause a droop in the voltage supplied by the voltage regulator, while a decrease in the current drawn (i.e. a downward current ramp) may be reflected as a spike in the supply voltage. A droop in the local supply voltage can slow down logic elements, potentially causing failures. Moreover, the voltage droop may be coupled back to the input of the voltage regulator, causing other circuits on a chip to fail.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Overview

This disclosure pertains to energy efficiency and energy conservation in integrated circuits, as well as code to execute thereon. For example, some implementations include techniques and arrangements for controlling current ramps in circuits. More particularly, some techniques and arrangements disclosed herein may detect current ramps in a circuit and act to control the current drawn. Implementations may be directed at detecting and controlling upward current ramps, downward current ramps, or both. These techniques and arrangements may be used as an alternative or as a complement to on-chip capacitance. Further, some implementations of these techniques and arrangements may allow for the operation of the circuit at a lower voltage, and thus at a lower power level than would be otherwise be possible, thereby providing power savings, energy efficiency and energy conservation.

In implementations discussed in detail herein, an indication of the power consumed by the processor is computed based on the current drawn in the processor to perform a set of operations dispatched for execution. The indication of current drawn by the processor may reflect current drawn by the actual hardware performing the dispatched operations as well as current drawn as a side effect of performing the dispatched operations, such as resultant memory traffic and backfill (i.e. fetching new instructions into the machine as space is freed up in the structures). As used herein, a set of operations can consist of one or more operations and an operation can be a macroinstruction, microinstruction or other operation performed by a processor. However, implementations are not limited to computing an indication based on a set of dispatched operations and may use any other indication of power consumed in the processor. Specifically, implementations may compute an estimation of the current drawn in a processor, compute the actual current drawn in the processor, detect or measure the current drawn in the processor, or use any combination of these and other indications of current drawn as a result of performing the dispatched operations. For example, the current drawn in the processor could be detected by detecting the current output by one or more voltage regulators of the processor in order to perform operations dispatched for execution in the processor. Moreover, while the computation of the estimated current drawn in a processor is discussed herein as being based on the operations dispatched for execution, implementations are not limited to this technique alone. For example, an alternative or complementary technique for estimating the current drawn in the processor could base the computation on the detection of toggling of the bits of data lines flowing through the processor.

Example Implementations

Figure 1:
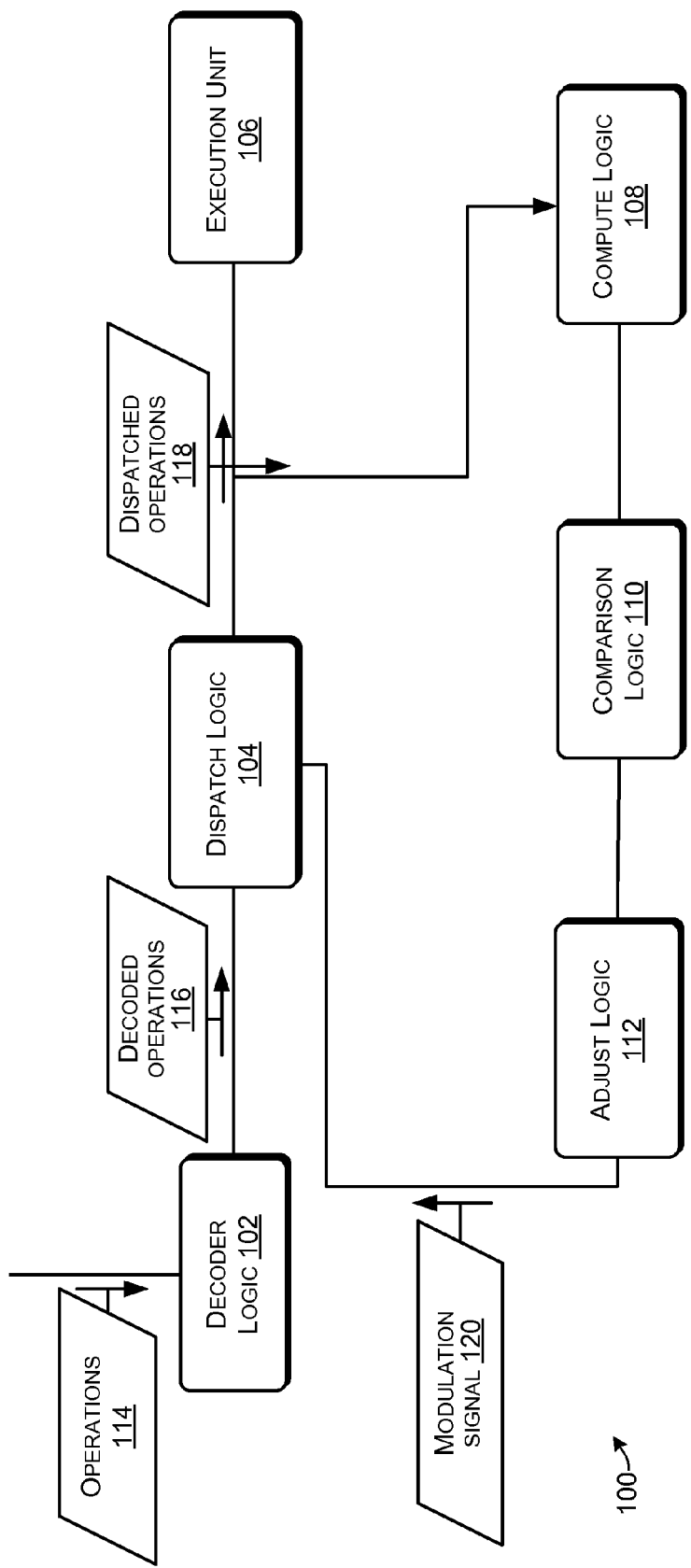
FIG. 1 illustrates select components of an example processor of a system according to some implementations.

FIG. 1 illustrates select components of an example processor 100 of an implementation. The processor 100 includes a decoder logic 102, a dispatch logic 104, an execution unit 106, a compute logic 108, a comparison logic 110, and an adjust logic 112.

In operation, the decoder logic 102 decodes operations 114 into decoded operations 116. The decoded operations 116 are sent to the dispatch logic 104. The dispatch logic 104 schedules the decoded operations 116 for execution by execution unit 106. According to the scheduling, the decoded operations are sent to the execution unit 106 and the compute logic 108 as dispatched operations 118.

For a first and a second set of the dispatched operations 118, the compute logic 108 computes a first and a second indication of power consumed by the processor 100 as a result of performing the first and the second set of operations respectively. The comparison logic 110 compares the first and second indications of power consumed. If the comparison indicates that a difference between the first and second indications of power consumed by the processor is greater than a threshold value, the adjust logic 112 adjusts a rate at which operations are performed by the processor by outputting modulation signal 120 to the dispatch logic 104.

Figure 2:
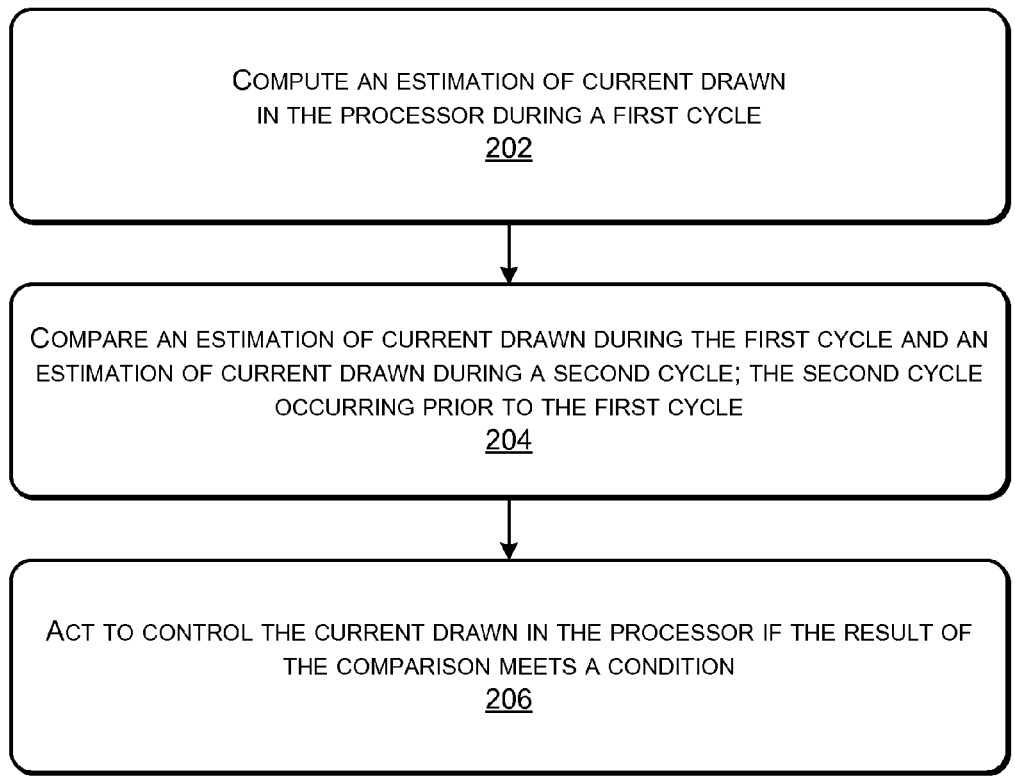
FIG. 2 illustrates an example process flow according to some implementations.

FIG. 2 illustrates an example process flow 200 of some implementations. At 202, an estimation of current drawn in a processor is computed for a first cycle. The estimation of current drawn in the processor may be computed based on a set of operations dispatched for execution in the first cycle and, optionally, one or more previous cycles. Herein, the first cycle may be referred to as the instant cycle. However, this should not be taken as limiting the first cycle to an instant cycle as the computation of the estimation of current drawn in a processor may be delayed one or more cycles. In addition, implementations are not limited to using operations dispatched in consecutive cycles. For example, implementations may use the operations dispatched in every nth cycle. Further, the number of cycles and the selection of which cycles the estimation is based upon is not limited and, in some implementations, may be dynamic and/or configurable. Moreover, implementations are not limited to using all operations dispatched in the relevant cycles to determine the estimation of current drawn in a cycle. For example, the computed estimation may be based only on operations which draw significant current or some other subset of the types of operations that are dispatched for execution. In addition, the computation of the estimation may be weighted for certain types of operations. For example, an operation that is known to result in twice as much current being drawn may be weighted twice as strongly in the computation of the estimation of current drawn.

At 204, the estimation of current drawn in the processor during the first cycle is compared with an estimation of current drawn in the processor during a second cycle that occurred prior to the first cycle. The number of cycles occurring between the first and second cycle is not limited to a specific number of cycles and can be determined based on the specifics of a given implementation. Further, in some implementations, the number of cycles occurring between the first cycle and the second cycle may be dynamic and/or configurable.

At 206, if the result of the comparison meets a condition, e.g. an estimated change in current drawn by the processor is greater than a threshold, action is taken to control the current drawn by the processor, such as by adjusting or controlling a rate at which operations are performed by the processor. For example, if the comparison indicates that a current ramp is occurring, the dispatching of operations in subsequent cycles can be modulated or blocked in the case of upward current ramps or dummy operations can be dispatched for execution in downward current ramps.

Figure 3:
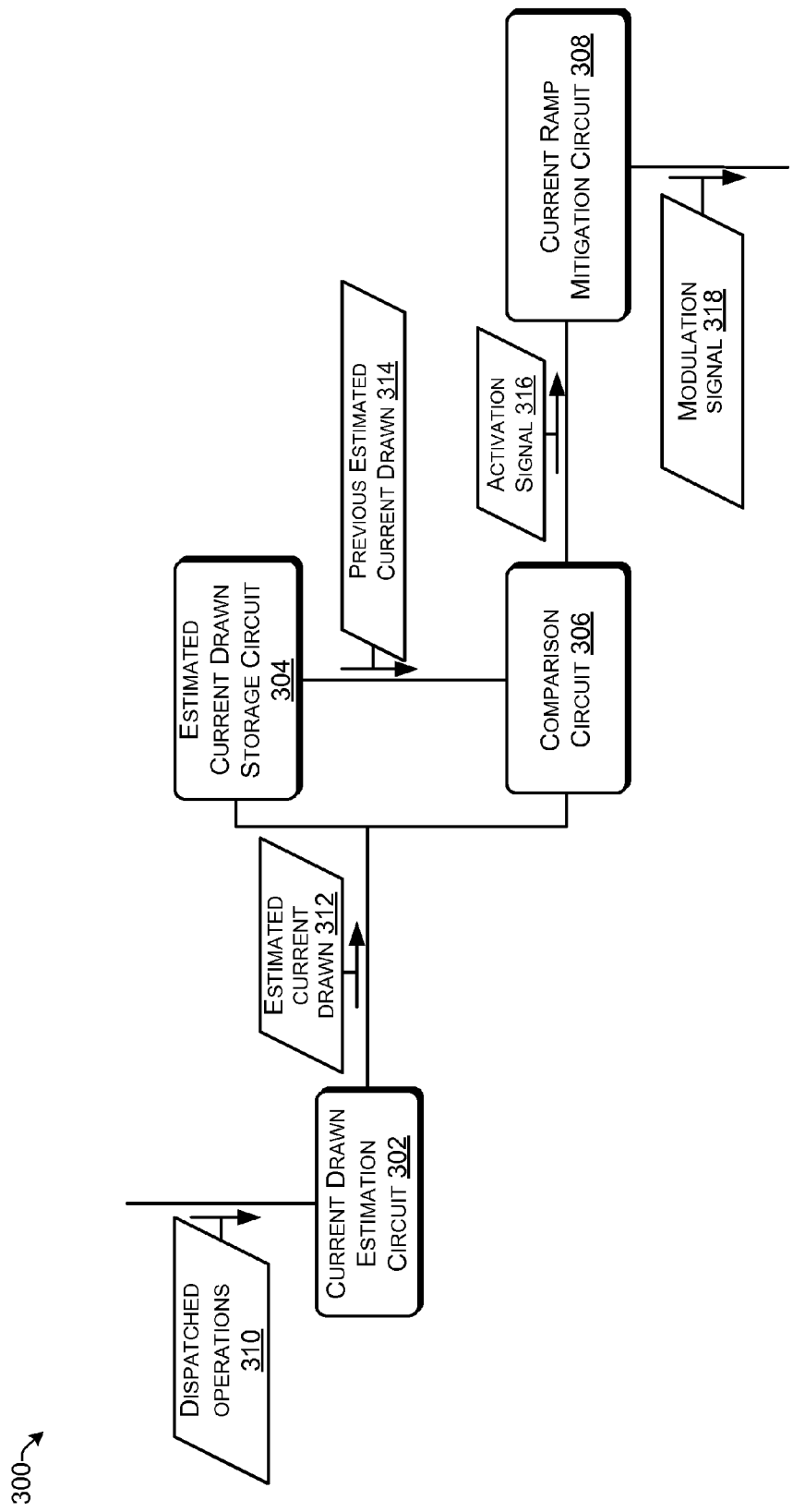
FIG. 3 illustrates select components of an example current ramp detection and mitigation circuit according to some implementations.

FIG. 3 illustrates an example implementation of a current ramp detection and mitigation circuit 300. The current ramp detection and mitigation circuit 300 includes a current drawn estimation circuit 302, an estimated current drawn storage circuit 304, a comparison circuit 306 and a current ramp mitigation circuit 308.

As shown in FIG. 3, information regarding dispatched operations 310 for a cycle of a processor is received by the current drawn estimation circuit 302. The current drawn estimation circuit 302 computes an estimated current drawn 312 in the cycle based on the dispatched operation 310 for the cycle and, optionally, one or more previous cycles. The estimated current drawn 312 in the cycle is output to the estimated current drawn storage circuit 304 and the comparison circuit 306. The estimated current drawn storage circuit 304 stores the estimated current drawn 312 computed by the current drawn estimation circuit 302 for one or more cycles. The estimated current drawn storage circuit 304 outputs a previous estimated current drawn 314 corresponding to a previous cycle. The comparison circuit 306 performs a comparison of the estimated current drawn 312 output by the current drawn estimation circuit 302 with the previous estimated current drawn 314 output by the estimated current drawn storage circuit 304. If the result of the comparison indicates that a change in current drawn is greater than a threshold value, an activation signal 316 is output by comparison circuit 306 to activate current ramp mitigation circuit 308. When activated, current ramp mitigation circuit 308 takes action to control the current drawn in subsequent cycles. For example, in upward current ramps the current ramp mitigation circuit 308 may output modulation signals 318 to modulate or block the dispatch of operations in the processor in subsequent cycles. In downward current ramps, the current ramp mitigation circuit 308 may dispatch dummy operations for execution. Alternative or complementary techniques for mitigating downward current ramps may include the forced toggling of the bits of unused registers or of unused signal lines in the processor to increase the current drawn in the processor. These examples are not exhaustive and in other implementations, the current ramp mitigation circuit 308 could modulate or block the fetching and decoding of instructions by a fetch and decode unit of the processor or take other actions to adjust the rate at which operations are performed in the processor.

Figure 4:
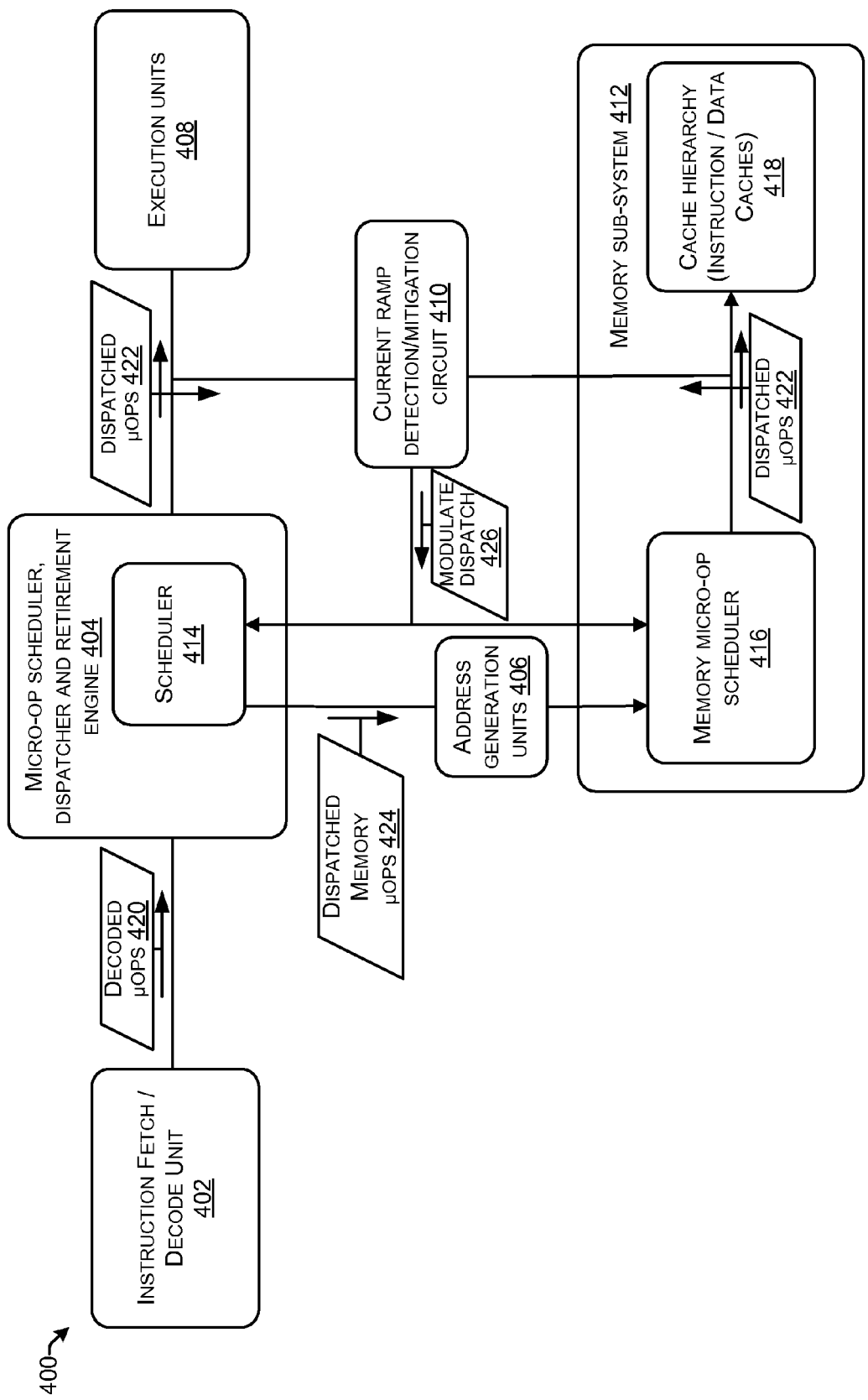
FIG. 4 illustrates select components of an example processor microarchitecture of a system according to some implementations.

FIG. 4 illustrates select components of an example processor microarchitecture 400 of an implementation. The processor microarchitecture 400 includes an instruction fetch/decode unit 402, a micro-op scheduler, dispatcher and retirement engine 404, address generation units 406, execution units 408, a current ramp detection/mitigation circuit 410, and a memory sub-system 412. The micro-op scheduler, dispatcher and retirement engine 404 includes a scheduler 414. The memory sub-system 414 includes a memory micro-op scheduler 416 and a cache hierarchy 418.

In operation, the instruction fetch/decode unit 402 fetches instructions and decodes the fetched instructions into micro-operations (referred to as μops hereinafter). The decoded μops 420 are sent to the micro-op scheduler, dispatcher and retirement engine 404. The scheduler 414 schedules the μops for dispatch and engine 404 dispatches μops 422 to the execution units 408 and memory μops 424 to the address generation units 406. The address generation units 406 receive dispatched memory μops 424 relating to memory and perform addressing functions for the μops, e.g., effective address calculations. The μops are then passed to the memory subsystem 412 to the memory micro-operation scheduler 416. The memory micro-operation scheduler 416 schedules and dispatches memory μops to the cache hierarchy 418.

The current ramp detection/mitigation circuit 410 detects at least a subset of the dispatched μops 422 dispatched from the micro-op scheduler, dispatcher and retirement engine 404 to the execution units 408 and from the memory micro-operation scheduler 416 to the cache hierarchy 418. Based on the detected dispatched μops 422, the current ramp detection/mitigation circuit 410 detects current ramps and outputs dispatch modulation signals 426. In the case of upward current ramps, the dispatched modulation signals 426 selectively block the dispatch of μops by micro-op scheduler, dispatcher and retirement engine 404 and memory micro-operations scheduler 416 in subsequent cycles. In the case of downward current ramps, the dispatch modulation signals 426 may include dummy μops to be dispatched for execution. In the implementation illustrated in FIG. 4, the current ramp detection/mitigation circuit 410 does not detect the dispatch of memory μops 424 to the address generation units 412. However, this is not limiting and implementations may detect the dispatch of μops 424 to the address generation units 406 and factor these μops 424 into the current ramp detection process.

Figure 5:
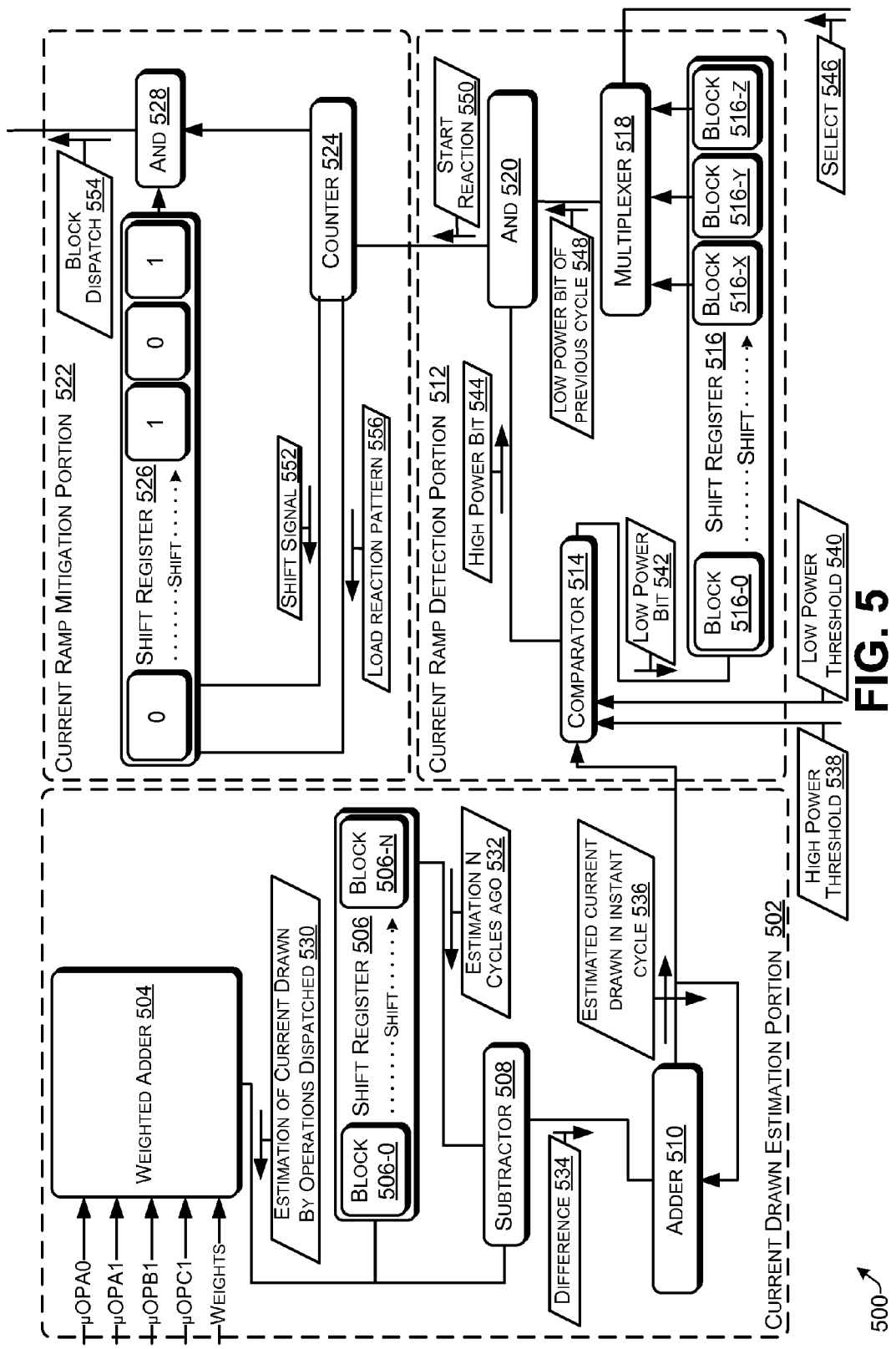
FIG. 5 illustrates an example current ramp detection and mitigation circuit according to some implementations.

FIG. 5 illustrates an example current ramp detection/mitigation circuit 500 according to some implementations. In the particular implementation illustrated in FIG. 5, upward current ramps are detected and the current is controlled using a reaction pattern to modulate the dispatch of μops. The current ramp detection/mitigation circuit 500 includes three general portions.

The first portion, the current drawn estimation portion 502, computes an estimated current drawn in a cycle based on the operations dispatched in an N cycle window, inclusive of the instant cycle. The current drawn estimation portion 502 includes a weighted adder 504, a shift register 506, a subtractor 508, and an adder 510.

The second portion, the current ramp detection portion 512, detects current ramps based on the estimated current drawn in the instant cycle and the estimated current drawn in a previous cycle. The current ramp detection portion 512 includes a comparator 514, a shift register 516, a multiplexer 518, and an AND gate 520.

The third portion, the current ramp mitigation portion 522, outputs signals to modulate the dispatch of μops in cycles following a detected current ramp by selectively blocking the dispatch of μops in subsequent cycles. The current ramp mitigation portion 522 includes a counter 524, a shift register 526 and an AND gate 528.

In operation, signals for μops dispatched in each cycle are received by weighted adder 504. As indicated above, signals may be received for all μops executable by the microarchitecture or a subset thereof. The weighted adder 504 computes an estimation of current drawn by operations dispatched 530 for the dispatched μops. The subset illustrated in FIG. 5 is an example set of μops that, in some processor microarchitectures, draw large amounts of current. In the example of FIG. 5, the following combination of high power μops may be dispatched in a given cycle and detected: two type A μops, μOPA0 and μOPA1, one type B μop, μOPB0, and one type C μop, μOPC1. The weighted adder 504 also receives weights assigned to the particular μops for use determining the estimated current drawn by the dispatched μops 530. For example, type A μops could be assigned a weight of one and type B μops could be assigned a weight of two. If two type A μops and one type B μop are dispatched in a given cycle, the computed estimation of current drawn by μops dispatched 530 for that cycle would be four.

The computed estimation of current drawn by μops dispatched 530 is received by shift register 506 and subtractor 508. The shift register 506 stores the computed estimation 530 in block 506-0 and shifts the computed estimation 530 once per cycle for N cycles in the manner of a queue. In a given cycle, shift register 506 outputs the estimation computed N cycles ago 532 to the subtractor 508 from block 506-N.

As indicated previously, the estimated current drawn in a particular cycle may be based on μops dispatched in a window of N cycles including the instant cycle and N−1 previous cycles. In some implementations, the estimations of each of the N cycles may be summed together in every cycle. Other implementations may use a "rolling sum" approach. That is, in each cycle, a stale estimation, i.e. the estimation from N cycles ago, is subtracted from the total from the previous cycle and the estimation for the instant cycle is added. The implementation illustrated in FIG. 5 uses variant of the "rolling sum" approach. In the implementation illustrated in FIG. 5, the estimation of current drawn by operations dispatched N cycles ago 532 is stale and needs to be subtracted from a rolling total of estimated current drawn by operations dispatched in the past N cycles at the same time the computed estimation for the instant cycle 530 is added to that rolling total. Using the associative property of arithmetic operations, this can be computed by subtracting the stale estimation 532 from the estimation of the instant cycle 530 and adding the result to the total of the previous cycle. This is accomplished by the subtractor 508 and adder 510.

Subtractor 508 computes the difference 534 between the computed estimation 530 output by the weighted adder 504 and the estimation of current drawn by operations dispatched N cycles ago 532 output from the block 506-N of shift register 506. It should be noted that if more current was estimated to be drawn by operations dispatched N cycles ago than in the instant cycle, the difference 534 is negative.

Difference 534 is output to the adder 510 which adds the difference 534 to the estimated current drawn 536 output by the adder 510 in the previous cycle. The estimated current drawn 536 output by the adder 510 is a total of the estimated current drawn by operations dispatched in an N cycle window, i.e. the "rolling total." In other words, adder 510 adds the result of the subtraction 534 to its own output from the previous cycle 536. For example, if the estimated current drawn by operations dispatched in the instant cycle 530 were four and the estimation for operations dispatched N cycles ago 532 were ten, the output 534 of the subtractor 508 is negative six and when added to the rolling total by adder 510, the estimated current drawn in the instant cycle 536 is six less than the estimated current drawn in the previous cycle.

The values of the estimation of current drawn by operations dispatched in a cycle and the estimated current drawn in a cycle should not be taken as actual measurement or values of electrical current. The estimations of current drawn by operations dispatched in a cycle and of current drawn in a cycle need only be indications of the relative magnitude of the current drawn.

The estimated current drawn in the instant cycle 536 is received by the comparator 514 which determines if the estimated current drawn 536 is above a high power threshold 538 or below a low power threshold 540. If the estimated current drawn 536 is below the low power threshold 540, a true bit is sent to the shift register 516 as low power bit 542. Otherwise, a false bit is sent to the shift register 516 as low power bit 542. Similarly, if the estimated current 536 is above the high power threshold 538, a true bit is sent to the AND gate 520 as high power bit 544. Otherwise, a false bit is sent to the AND gate 520 as high power bit 544. Herein, bits and/or signals may be discussed as being true, false, one, zero, on or off. It should be noted that these are logical values and may be realized in various ways according to the particular implementation.

Each cycle, shift register 516 receives the low power bit 542 output by comparator 514 and stores the bit in 516-0. The low power bits of prior cycles are shifted one position forward in the shift register 516. The shift register 516 outputs the low power bits of prior cycles stored in block 516-x, block 516-y, and block 516-z to the multiplexer 518.

Multiplexer 518 receives a selection input 546 that determines the number of cycles apart a comparison should be made to determine if a current ramp is occurring. Specifically, the select input 546 received by multiplexer 518 selects which low power bit 548 of the low power bits stored in block 516-x, block 516-y, or block 516-z to output to the AND gate. In some implementations, the select input 546 may be varied from cycle to cycle. In other implementations, the multiplexer 518 may be removed and the low power bit of block 516-z of the shift register 516 may be output directly to AND gate 520.

The AND gate 520 receives the high power bit 544 for the instant cycle from comparator 514 and the low power bit 548 from a cycle occurring prior to the instant cycle. If the bits indicate that low current was being drawn in the prior cycle and high current is being drawn in the instant cycle (i.e. both bits are true), a start reaction signal 550 is output to activate the current ramp mitigation portion 522.

The current ramp mitigation portion 522 is activated by enabling the operation of counter 524. Counter 524 is configured to enable the current ramp mitigation portion 522 for a pre-defined number of cycles. For each cycle it is activated, the counter outputs a true bit to AND gate 528 and a shift signal 552 to the shift register 526.

Shift register 526 stores a reaction pattern. The use of the reaction pattern allows for the dispatch of operations to be modulated so that the increase in current drawn (i.e. the current ramp) is distributed across a greater number of cycles. In the implementation shown in FIG. 5, a reaction pattern is a pattern of logical true's and false's which will determine which cycles of the pre-defined number of cycles the current ramp mitigation portion 522 will output signals 554 to block the dispatch of μops. Each cycle, the shift register 526 outputs its right-most bit to the AND gate 528 and shifts upon receiving the shift signal 552.

The AND gate 528 receives the outputs of the shift register 526 and the enable signal from the counter and outputs a block dispatch signal 554 if both inputs represent a logical true value. For example, the first bit of the reaction pattern (right-most) is true and results in dispatches being blocked in the first cycle the current ramp mitigation portion 522 is active. The second bit of the reaction pattern is false and results in dispatches being allowed in the second cycle. This process is repeated for each cycle of the predefined number of cycles.

Upon completion of the predefined number of cycles, the counter 524 disables the current ramp mitigation portion 522 by outputting a false bit to the AND gate 528. The counter 524 then outputs a load reaction pattern signal 556 that causes the shift register 526 to reload the reaction pattern. Counter 524 then waits until another state reaction signal 550 is received.

While the implementation illustrated in FIG. 5 includes a current ramp mitigation portion 522 which uses a pre-programmed reaction pattern to modulate the dispatch of μops, implementations are not so limited. Specifically, in some implementations, the shift register 526 and the AND gate 528 could be removed and the dispatch of μops could be blocked entirely during the pre-defined number of cycles. Other implementations could include a finite state machine (FSM) within the current ramp mitigation portion 522. Multiple aspects of the operation of the current ramp mitigation portion 522 could be varied based on the particular configuration of the finite state machine. For example, when triggered, the FSM could proceed through a series of states, where each state enforces a particular dispatch rate. The first state would begin with a sufficiently low dispatch rate to stop the detected current ramp, and successive states would increase the dispatch rate gradually until full dispatch was achieved. The first state (and thus the magnitude of the dispatch modulation) could be determined based upon the severity of the current ramp estimated by the current ramp detection portion 512. Further, while the implementation shown in FIG. 5 uses a "rolling total" approach to determine the estimated current drawn in the instant cycle 536, variations on this approach or different approaches could be used in other implementations. For example, other implementations could use a "rolling average" approach in which the "rolling total" is divided by N (i.e. the number of cycles in the window). Other such variations on the form of the estimated current drawn in the instant cycle 536 would also be apparent to one of ordinary skill in the art in view of the disclosure provided herein.

Figure 6:
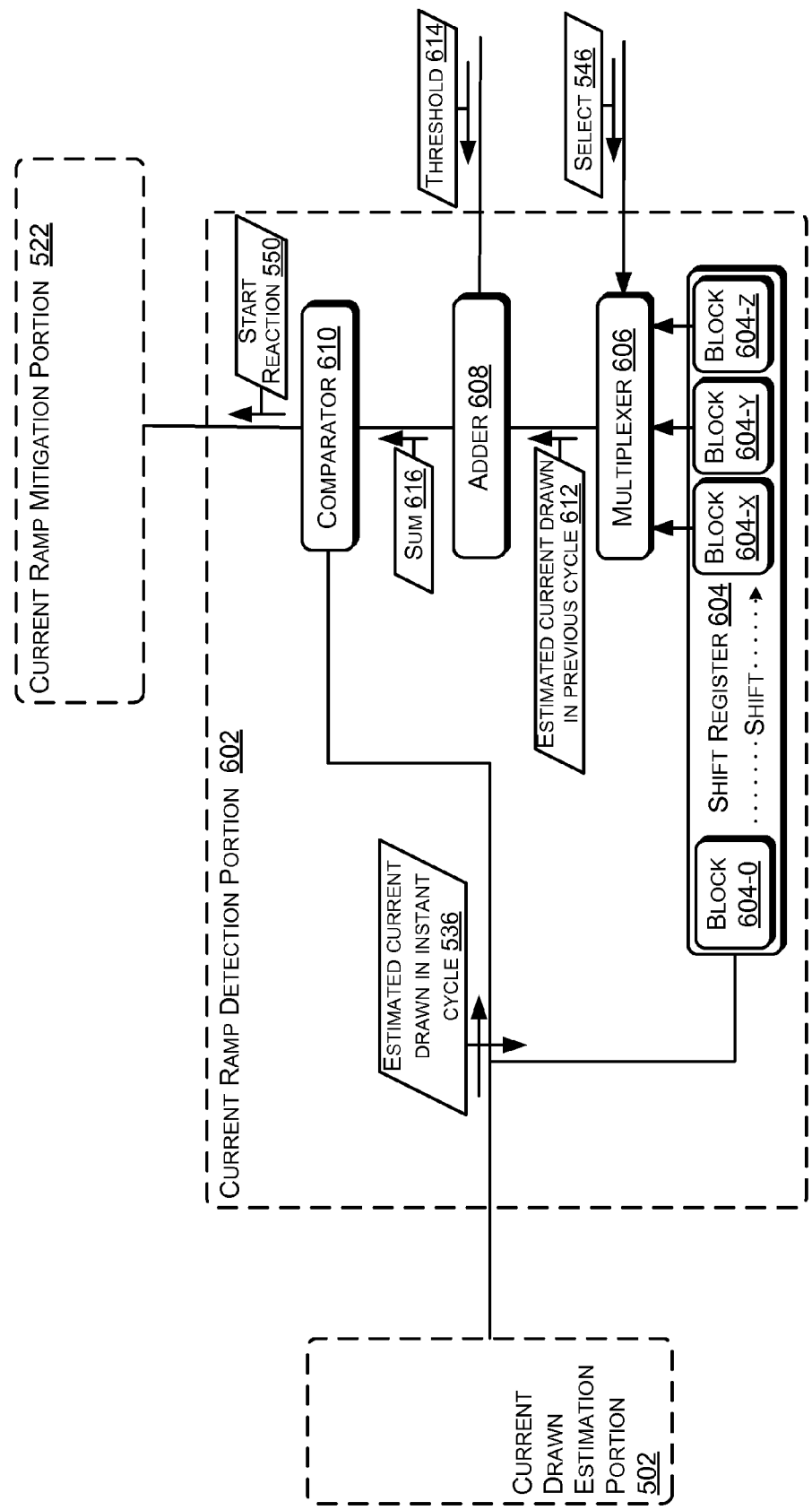
FIG. 6 illustrates an example current ramp detection and mitigation circuit according to some implementations.

FIG. 6 illustrates an example current ramp detection/mitigation circuit 600 according to some implementations including a modified current ramp detection portion 602 that may detect upward current ramps. In particular, the example current ramp detection portion 602 may not determine if the estimated current drawn for a cycle is above a high threshold or below a low threshold. Rather, the current ramp detection portion 602 may detect current ramps based on the change in the estimated current drawn between two cycles regardless of their respective individual values. The current ramp detection portion 602 includes a shift register 604, a multiplexer 606, an adder 608 and a comparator 610.

In FIG. 6, the estimated current drawn in the instant cycle 536 output by current drawn estimation portion 502 is received by comparator 610 and shift register 604. Each cycle, the values of the estimated current drawn for prior cycles are shifted through the shift register 604 starting in block 604-0. The shift register 604 outputs the values stored in block 604-x, block 604-y, and block 604-z to the multiplexer 606.

Multiplexer 606 receives a selection input 546 that determines the number of cycles apart a comparison should be made to determine if a current ramp is occurring. Specifically, the select input 546 received by multiplexer 606 selects which estimated current drawn in a previous cycle 612 to output to the adder 608 from among the estimated current drawn values stored in block 604-x, block 604-y, or block 604-z.

Adder 608 receives a threshold value 614. Adder 608 then computes the sum 616 of the estimated current drawn in a previous cycle 612 and the received threshold value 614.

The comparator 610 receives the estimated current drawn in the instant cycle 536 from portion 502 and the sum 616 computed by adder 608. A comparison is made to determine if the estimated current drawn in the instant cycle 536 is greater than the sum 616 computed by adder 608. In other words, the comparison determines if the current has increased more than the threshold value 614 between the previous cycle and the instant cycle. If so, comparator 610 outputs a start reaction signal 550 to enable or activate the current ramp mitigation portion 522.

It should be noted that the order of operations performed by adder 608 and comparator 610, i.e. determining if estimation 536 is greater than the sum of estimation 612 and threshold 614, is not limited to that described above. For example, estimation 612 could be subtracted from estimation 536 and the result compared to the threshold 614.

Figure 7:
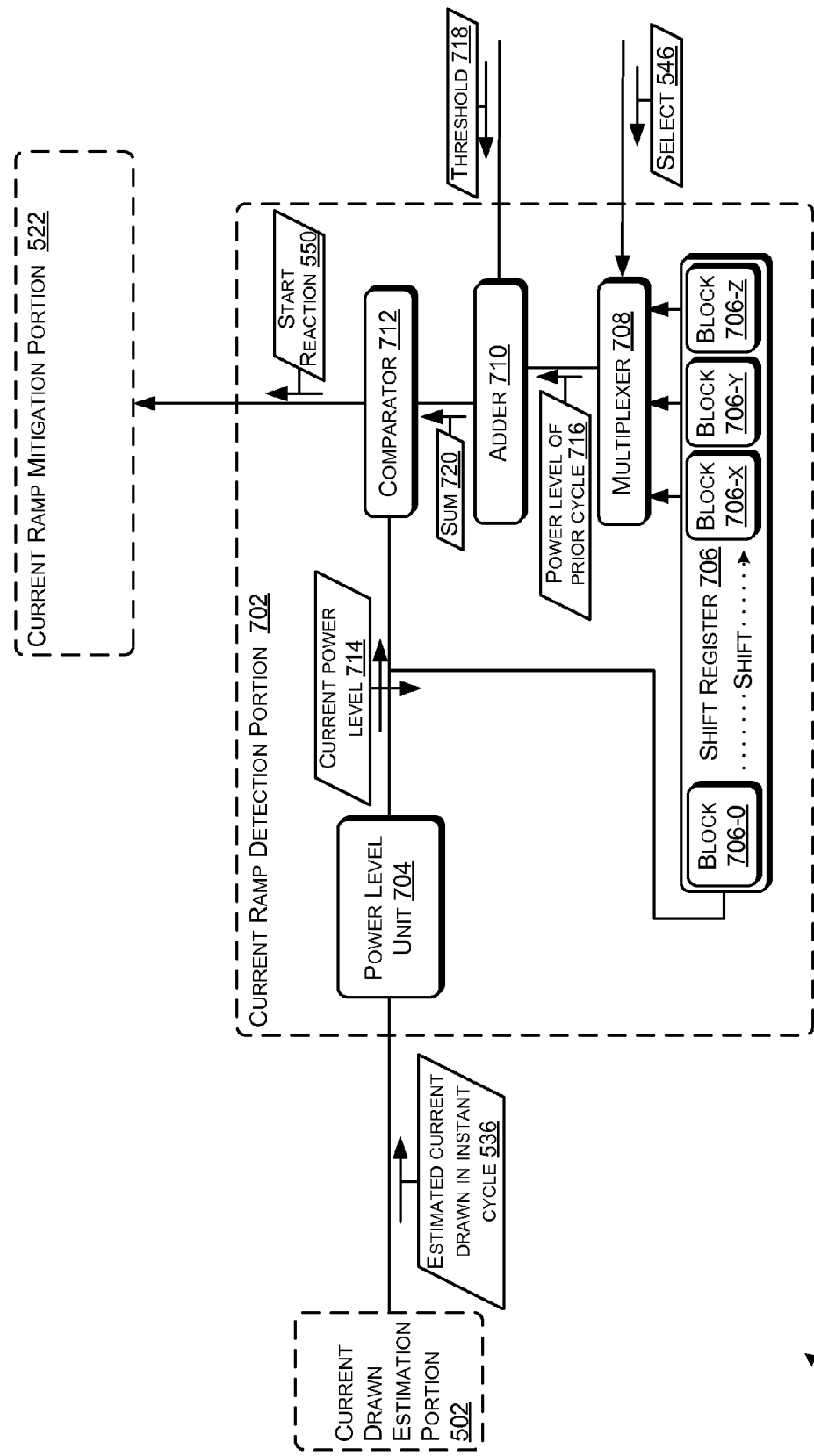
FIG. 7 illustrates an example current ramp detection and mitigation circuit according to some implementations.

FIG. 7 illustrates an example current ramp detection/mitigation circuit 700 according to some implementations including a modified current ramp detection portion 702 that may detect upward current ramps. The current ramp detection portion 702 includes a power level unit 704, a shift register 706, a multiplexer 708, an adder 710 and a comparator 712.

In FIG. 7, the estimated current drawn in the instant cycle 536 output by current drawn estimation portion 502 is received by power level unit 704. Power level unit 704 classifies the estimated current drawn in the instant cycle 536 into one of a number of discrete power levels. Assuming that the range of possible values for estimated current drawn in the instant cycle 536 is zero to seventy-five (0-75), the power levels could be assigned as shown in Table 1.

TABLE 1

| | Power Level | | | | |
|---|---|---|---|---|---|
| | 1 | 2 | 3 | 4 | 5 |
| Range of Values | 0-15 | 16-30 | 31-45 | 46-60 | 61-75 |

Thus, if the estimated current drawn in the instant cycle 536 is, for example thirty-three (33), the power level unit 704 outputs a three (3) as the current power level 714.

The current power level 714 is output to comparator 712 and shift register 706. Each cycle, the power levels for prior cycles are shifted through the shift register 706, the current power level is stored in block 706-0 and the shift register 706 outputs the power levels stored in block 706-x, block 706-y, and block 706-z to the multiplexer 708.

Multiplexer 708 receives a selection input 546 that determines the number of cycles apart a comparison should be made to determine if a current ramp is occurring. Specifically, the select input received by multiplexer 708 selects a power level from among the power levels of the cycles corresponding to block 706-x, block 706-y, or block 706-z. The selected power level is output to adder 710 as the power level of prior cycle 716.

Adder 710 receives the power level of prior cycle 716 and a threshold value 718. Adder 710 then computes a sum 720 of the previous power level 716 and the received threshold value 718. The sum 720 is then output to comparator 712.

The comparator 712 receives the current power level 714 from power level assignment unit 704 and the sum 720 computed by adder 710. A comparison is made to determine if the current power level 714 is greater than the sum 720 computed by adder 710. In other words, the comparison determines if the current has increased more than the threshold number 718 of power levels between the previous cycle and the instant cycle. If so, comparator 712 outputs a start reaction signal 550 to enable or activate the current ramp mitigation portion 522.

Figure 8:
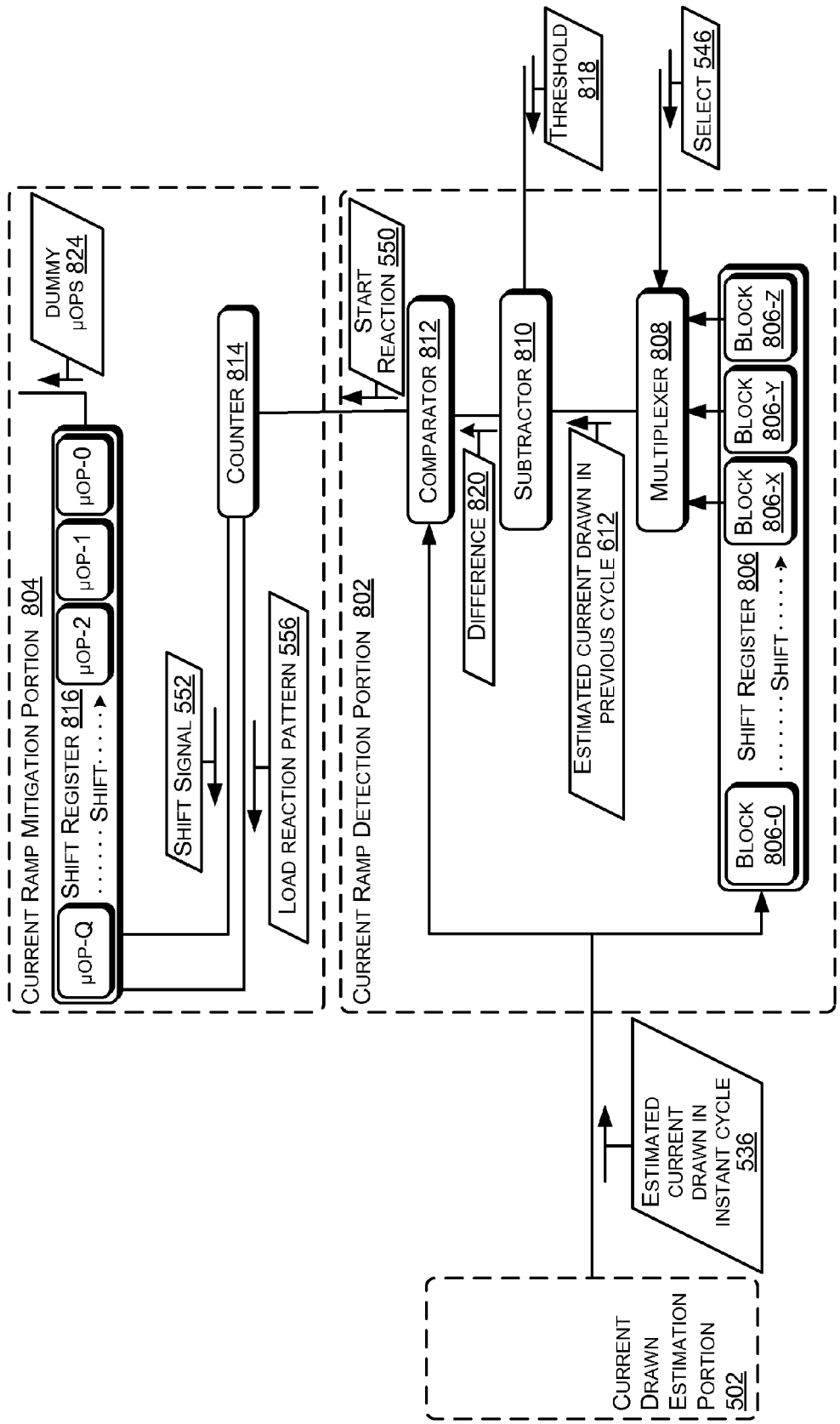
FIG. 8 illustrates select components of an example current ramp detection and mitigation circuit according to some implementations.

FIG. 8 illustrates an example current ramp detection/mitigation circuit 800 according to some implementations including a modified current ramp detection portion 802 and a modified current ramp mitigation portion 804. In particular, the current ramp detection/mitigation circuit may be configured to detect and mitigate downward current ramps. The current ramp detection portion 802 includes a shift register 806, a multiplexer 808, a subtractor 810 and a comparator 812. The current ramp mitigation portion 804 includes a counter 814 and a shift register 814.

In FIG. 8, the estimated current drawn in the instant cycle 536 output by current drawn estimation portion 502 is received by shift register 806 and comparator 812. Each cycle, the values of the estimated current drawn for prior cycles are shifted through the shift register 806, the estimated current drawn in the instant cycle 536 is stored in block 806-0, and shift register 806 outputs the values stored in block 806-x, block 806-y, and block 806-z to the multiplexer 808.

Multiplexer 808 receives a selection input 546 that determines the number of cycles apart a comparison should be made to determine if a current ramp is occurring. Specifically, the select input received by multiplexer 808 selects an estimated current drawn in a previous cycle from among the estimations of current drawn in the cycles corresponding to blocks 806-x, 806-y, or 806-z. The selected estimated current drawn is output to subtractor 810 as the estimated current drawn in a previous cycle 612.

Subtractor 810 receives the estimated current drawn in a previous cycle 612 and a threshold value 818. Subtractor 810 then computes the difference 820 of the estimated current drawn in a previous cycle 612 and the received threshold value 818. The difference 820 is then output to comparator 812.

The comparator 812 receives the estimated current drawn in the instant cycle 536 from portion 502 and the difference 820 computed by subtractor 810. A comparison is made to determine if the estimated current drawn of the instant cycle 536 is less than the difference 820 computed by subtractor 810. In other words, the comparison determines if the current has decreased more than the threshold value 818 between the previous cycle and the instant cycle. If so, comparator 812 outputs a start reaction signal 550 to enable or activate the current ramp mitigation portion 804.

The current ramp mitigation portion 804 is activated by enabling the operation of counter 814. Counter 814 is configured to enable the current ramp mitigation portion 804 for a pre-defined number of cycles. For each cycle of the pre-defined number of cycles, the counter outputs an enable signal (not shown) and a shift signal 552 to the shift register 816.

Shift register 816 stores a reaction pattern. In the implementation shown in FIG. 8, a reaction pattern is a pattern of dummy μops (i.e. μOP-0, μOP-1, μOP-2, . . . μOP-Q) which will be output by the current ramp mitigation portion 804 during the pre-defined number of cycles to mitigate the detected downward current ramp. Each cycle the shift register 816 is enabled, shift register 806 outputs the right-most μop such that it is dispatched for execution in the processor. Alternatively, sets of μops could be dispatched in each cycle or different numbers of μops could be dispatched in different cycles according to some pattern (which may optionally be a programmable pattern).

Upon completion of the predefined number of cycles, the counter 814 outputs a signal that causes the shift register 816 to reload the reaction pattern and then disables the current ramp mitigation portion 804.

While the mitigation of downward current ramps in current ramp mitigation portion 804 is performed by dispatching dummy μops, implementations are not limited to this technique alone. For example, an alternative or complementary technique for mitigating a downward current ramp in a processor could include the forced toggling of the bits of unused registers or of unused signal lines of the processor which would cause an increase in the current drawn.

While several examples have been illustrated herein for discussion purposes, numerous other configurations may be used and thus implementations herein are not limited to any particular configuration or arrangement. For example, the discussion herein refers to signals being output and received by particular components of the processor. This should not be taken as a limitation as such communication need not be direct and the particular components need not necessarily be a single functional unit. For example, the discussion herein refers to portions of the current ramp detection/mitigation circuits sending and receiving signals. This is not to be taken as limiting implementations to only those in which the portions directly send and receive signals from one another. The signals could instead be relayed by a separate unit upon receipt of the signal. Further, the order of operations used to compute the estimations of current drawn and to perform the comparisons to detect current ramps are not limited to those discussed above. Examples of variations of the order of operations were discussed above with respect to FIGS. 5 and 6. Other variations in the order of operations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Example System Architecture

Figure 9:
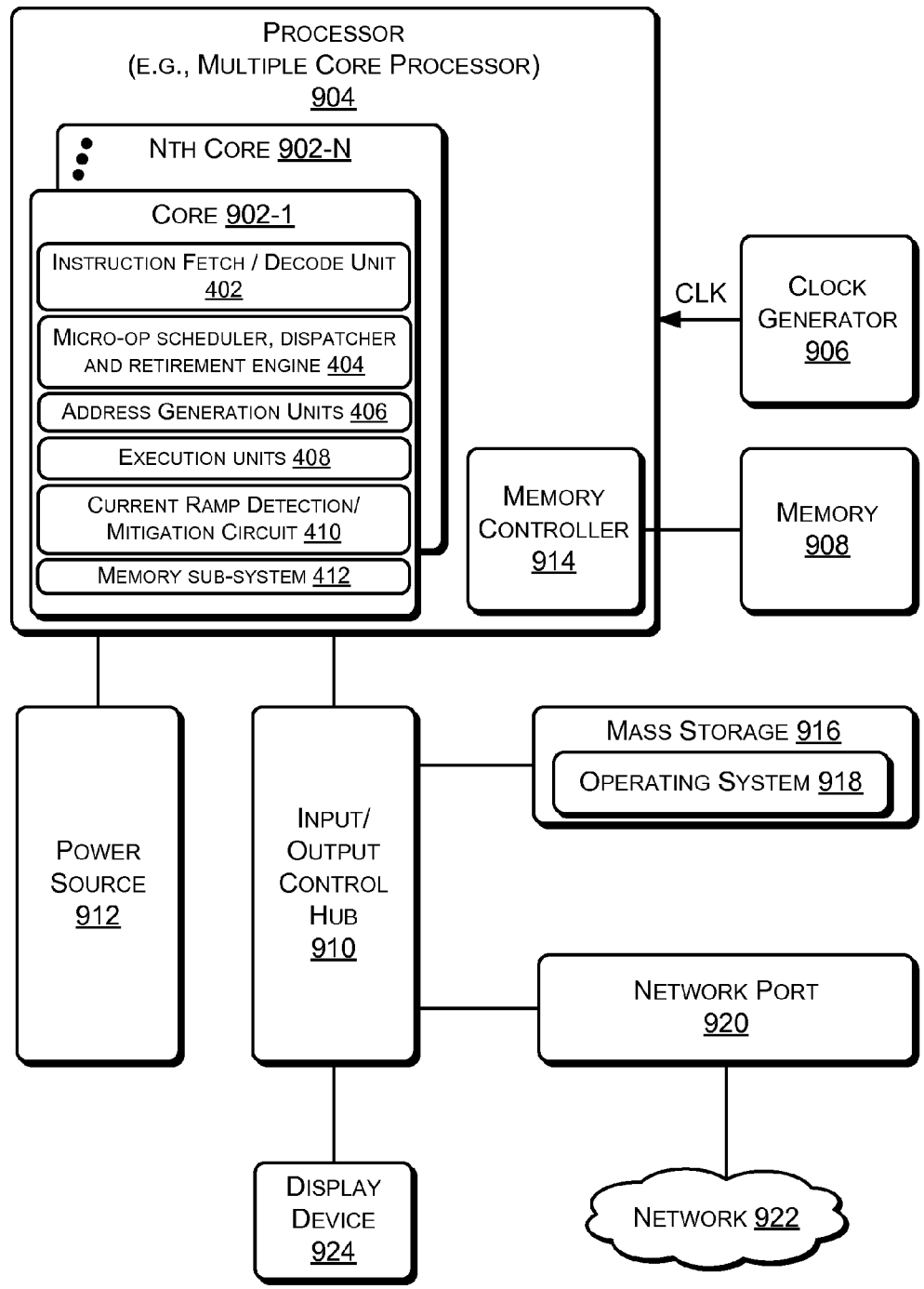
FIG. 9 illustrates an example system in which some implementations may operate.

FIG. 9 illustrates select components of an example architecture of a system 900 as an example of the environment in which some implementations may operate. System 900 may encompass any of a variety of devices, such as a desktop computing device, a laptop computing device, tablet computing device, netbook computing device, wireless computing device, or a server computing device, as several non-limiting examples.

The system 900 may include one or more cores 902 in one or more processors, such as a processor 904, a clock generator 906, a memory 908 (e.g., random access memory (RAM)), an input/output control hub 910, and a power source 912 (e.g., a battery or a power supply). The processor 904 may include a single core 902-1 or multiple cores 902-1, . . . , 902-N (where N is an integer >1), such as a first core 902-1 and one or more additional cores, up to and including an $N^{th}$ core 902-N. The cores 902 may be homogeneous or heterogeneous. For example, if the cores 902 are heterogeneous, one or more cores 902 could be general-purpose processor cores while one or more other cores 902 could be special-purpose processor cores (i.e. digital signal processor cores or graphics processing unit cores) or co-processor cores. Alternatively, two or more cores 902 could have similar functionality, but differ in other ways. For instance, they could operate in different power envelopes, or at different performance levels. Further, it is also possible that some cores 902 may share components with each other, such as the dispatch or execute components. The processor 904 may include a memory controller 914 to enable access (e.g., reading from or writing) to the memory 908. In some embodiments, at least one of the N cores 902 may include may include instruction fetch/decode unit 402, micro-op scheduler, dispatcher and retirement engine 404, address generation units 406, execution units 408, current ramp detection/mitigation circuit 410, and memory sub-system 412.

The clock generator 906 may generate a clock signal that is the basis for an operating frequency of one or more of the N cores 902 of the processor 904. For example, one or more of the N cores 902 may operate at a multiple of the clock signal generated by the clock generator 906.

The input/output control hub 910 may be coupled to a mass storage 916. The mass storage 916 may include one or more non-volatile storage devices, such as disk drives, solid state drives, and the like. An operating system 918 may be stored in the mass storage 916.

The input/output control hub 910 may be coupled to a network port 920. The network port 920 may enable the system 900 to communicate with other devices via a network 922. The network 922 may include multiple networks, such as wireline networks (e.g., public switched telephone network and the like), wireless networks (e.g., 902.11, code division multiple access (CDMA), global system for mobile (GSM), Long Term Evolution (LTE) and the like), other types of communication networks, or any combination thereof. The input/output control hub 910 may be coupled to a display device 924 that is capable of displaying text, graphics, and the like.

As described herein, the processor 904 may include multiple computing units or multiple cores. The processor 904 can be implemented as one or more microprocessors, microcomputers, microcontrollers, digital signal processors, central processing units, state machines, logic circuitries, and/or any devices that manipulate signals based on operational instructions. Among other capabilities, the processor 904 can be configured to fetch and execute computer-readable instructions stored in the memory 908 or other computer-readable media.

The memory 908 is an example of computer storage media for storing instructions which are executed by the processor 904 to perform the various functions described above. The memory 908 may generally include both volatile memory and non-volatile memory (e.g., RAM, ROM, or the like). The memory 908 may be referred to as memory or computer storage media herein, and may be a non-transitory media capable of storing computer-readable, processor-executable program instructions as computer program code that can be executed by the processor 904 as a particular machine configured for carrying out the operations and functions described in the implementations herein.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the above-described implementations are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught above. Moreover, the apparatus', methods, and systems described herein are not limited to physical computing devices, but may also relate to software optimizations for energy conservation and efficiency. As is readily apparent in the description above, the embodiments of methods, apparatus', and systems described herein (whether in reference to hardware, firmware, software, or a combination thereof) are vital to a 'green technology' future, such as for power conservation and energy efficiency in products that encompass a large portion of the US economy. For example, the techniques and arrangements described herein allow for the operation of at least a portion of the processor at a lower voltage, and thus at a lower power level than would be otherwise be possible, thereby, providing power savings, energy efficiency and energy conservation.

Further, although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method performed by a core, the method comprising:
decoding a first and second set of operations;
performing at least portions of a first and a second set of operations;
scheduling for execution one or more of the first and second set of operations;
comparing a first indication of power consumed by the core as a result of performing the first set of operations with a second indication of power consumed by the core as a result of performing the second set of operations; and
adjusting a rate at which operations are performed by the core when a difference between the first indication of power consumed by the core and the second indication of power consumed by the core is greater than a threshold value; and
generating a clock signal that is a basis for an operating frequency of the core.

2. The method of claim 1, further comprising:
adjusting the rate at which the operations are performed by the core at least by outputting a signal to prevent the operations from being at least one of decoded and dispatched for execution in one or more cycles.

3. The method of claim 2, wherein preventing operations from being at least one of decoded and dispatched for execution in one or more cycles is based on a programmable reaction pattern.

4. The method of claim 2, wherein preventing operations from being at least one of decoded and dispatched for execution in one or more cycles is based on a dispatch rate controlled by a finite state machine logic.

5. The method of claim 1, wherein the first and second sets of operations each comprise operations dispatched in respective first and second sets of one or more cycles and the first and second sets of operations are of a defined subset of operations which the core is capable of executing.

6. The method of claim 1, further comprising:
computing the first and second indication of power consumed by the core as a result of performing the first and second sets of operations as a weighted summation using weights defined for one or more types of operations.

7. The method of claim 1, further comprising:
computing the first and second indication of power consumed by the core as a result of performing the first and second sets of operations as a weighted average using weights defined for one or more types of operations.

8. The method of claim 1, further comprising:
adjusting the rate at which operations are performed by the core by one or more of:
dispatching dummy operations for execution; and
performing dummy bit toggling.

9. The method of claim 1, wherein the first and second sets of operations are operations dispatched in a first and second sets of cycles, respectively, and the core further comprises a compute logic to compute the first and second indications by maintaining a weighted rolling sum for the operations of the first and second sets of operations as the respective first and second sets of cycles occur.

10. A system comprising:
a multi-core processor, wherein each core of the multi-core processor includes,
a decoder to decode a first and second set of operations, an execution unit coupled to the decoder to perform at least portions of the first and second set of operations, a dispatcher coupled to the decoder and the execution unit to schedule for execution one or more of the first and second set of operations, a comparison logic to compare a first indication of power consumed by the core as a result of performing a first set of operations with a second indication of power consumed by the core as a result of performing a second set of operations, and an adjust logic to adjust a rate at which operations are performed by the core when a difference between the first indication of power consumed by the core and the second indication of power consumed by the core is greater than a threshold value; and a clock generator to generated a clock signal that is a basis for an operating frequency of the cores.

11. The system of claim 10, wherein the second logic is to adjust the rate at which operations are performed by the core at least by outputting a signal to prevent operations from being at least one of decoded and dispatched for execution in one or more cycles.

12. The system of claim 11, wherein the second logic is to output the signal to prevent operations from being at least one of decoded and dispatched for execution in one or more cycles according to a programmable reaction pattern.

13. The system of claim 11, wherein the second logic is to output the signal to prevent operations from being at least one of decoded and dispatched for execution in one or more cycles based on a dispatch rate controlled by a finite state machine logic.

14. The system of claim 10, wherein:
the plurality of power levels include at least a low power level and a high power level; and
the second logic is to adjust the rate at which operations are performed by the core at least when the comparison indicates that one of the power level of the first set of operations and the power level of the second set of operations is the high power level and one of the power level of the first set of operations and the power level of the second set of operations is the low power level.

15. The system of claim 10, wherein:
the plurality of power levels are configurable; and
the plurality of power levels each correspond to a respective range of possible values for the first and second indications of power consumed and the second logic adjusts the rate at which operations are performed by the core at least when a difference between the first power level and the second power level is greater than a threshold number of power levels.

16. The system of claim 10, wherein:
the first and second sets of operations each comprise operations dispatched in respective first and second sets of one or more cycles; and
the first and second sets of operations are of a defined subset of operations which the core is capable of executing.

17. The system of claim 10, further comprising a compute logic to compute the first and second indications of power consumed by the core as a result of performing the first and second set of operations as one of a weighted summation and a weighted average, the one of the weighted summation and the weighted average using weights defined for one or more types of operations.

* * * * *